United States Patent
Saito et al.

(10) Patent No.: US 8,299,169 B2
(45) Date of Patent: Oct. 30, 2012

(54) COATING FLUID APPLICABLE BY HAND FOR SOL-GEL FILM FORMATION

(75) Inventors: Masanori Saito, Matsusaka (JP); Shigeo Hamaguchi, Matsusaka (JP); Soichi Kumon, Matsusaka (JP); Yoshinori Akamatsu, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 335 days.

(21) Appl. No.: 12/598,876

(22) PCT Filed: Apr. 28, 2008

(86) PCT No.: PCT/JP2008/058184
§ 371 (c)(1),
(2), (4) Date: Nov. 4, 2009

(87) PCT Pub. No.: WO2008/139920
PCT Pub. Date: Nov. 20, 2008

(65) Prior Publication Data
US 2010/0143600 A1    Jun. 10, 2010

(30) Foreign Application Priority Data

May 8, 2007   (JP) .................. 2007-123302
Mar. 13, 2008  (JP) .................. 2008-064078

(51) Int. Cl.
*C08L 83/04*  (2006.01)
*B05D 3/02*   (2006.01)
*B05D 1/02*   (2006.01)
*B05D 1/28*   (2006.01)

(52) U.S. Cl. ..... 524/588; 524/858; 427/387; 427/421.1; 427/428.01

(58) Field of Classification Search .......... 524/588, 524/858; 528/12; 427/387
See application file for complete search history.

(56) References Cited

U.S. PATENT DOCUMENTS

| | | | | |
|---|---|---|---|---|
| 7,601,792 | B2 * | 10/2009 | Higuchi et al. | ............. 528/39 |
| 2004/0209084 | A1 * | 10/2004 | Yamaya et al. | ............. 428/421 |
| 2005/0158566 | A1 | 7/2005 | Higuchi et al. | |
| 2007/0036985 | A1 | 2/2007 | Kamitani et al. | |
| 2007/0212534 | A1 | 9/2007 | Sasaki et al. | |
| 2007/0212571 | A1 | 9/2007 | Inoguchi et al. | |
| 2009/0087573 | A1 | 4/2009 | Saito et al. | |

FOREIGN PATENT DOCUMENTS

| | | | |
|---|---|---|---|
| JP | 1-306476 | A | 12/1989 |
| JP | 8-283661 | A | 10/1996 |
| JP | 2001-316635 | A | 11/2001 |
| JP | 2002-60651 | A | 2/2002 |
| JP | 2002-228989 | A | 8/2002 |
| JP | 2005-200546 | A | 7/2005 |
| JP | 2006-111851 | A | 4/2006 |
| JP | 2008-30015 | A | 2/2008 |

OTHER PUBLICATIONS

Corresponding International Search Report dated Jul. 15, 2008 (Two (2) pages).

* cited by examiner

*Primary Examiner* — Tae H Yoon
(74) *Attorney, Agent, or Firm* — Crowell & Moring LLP

(57) ABSTRACT

A coating solution for obtaining sol-gel films, the coating solution being composed of a solid matter and a solvent, the solid matter including a silicon oxide oligomer obtained by subjecting an alkoxysilane to hydrolysis and polycondensation in an acid aqueous solution; the solvent including an organic solvent having a boiling point of 100° C. or higher and a viscosity of 3.5 mPa·s or lower and the aqueous acid solution, the number average molecular weight of the silicon oxide oligomer in terms of polystyrene being 500-4000, the content of the solid matter in the coating solution being 8-30 weight %, and the content of the silicon oxide oligomer in the solid matter being 10 weight % or greater.

6 Claims, No Drawings

COATING FLUID APPLICABLE BY HAND FOR SOL-GEL FILM FORMATION

TECHNICAL FIELD

The present invention relates to a film, that is, a sol-gel film, formed by undergoing a process having the step of hydrolyzing and polycondensing an alkoxide compound.

BACKGROUND OF THE INVENTION

Sol-gel film is a film formed by undergoing the steps of forming a coating solution having an oligomer by allowing a hydrolysis and polycondensation reaction of an alkoxide compound to proceed, then applying this on a substrate, and then drying, etc. Since it is possible to introduce into sol-gel film a functional material capable of optically, electrically and chemically generating functions, the use and the proposal are conducted in various uses. In particular, a sol-gel film having a film thickness exceeding 0.5 μm has high usefulness, in view of providing optical and chemical functions.

On the other hand, in view of practical use of sol-gel film, it is an important study task to make the film higher in wear resistance and hardness. It is disclosed in Patent Publication 1 that a film superior in flatness and superior also in wear resistance is obtained by a dipping method by adjusting the amount of a surfactant to be added to 10-30 weight % of an organic silicon compound, 30-60 weight % of a metal oxide fine particle sol, 10-50 weight % of a water-soluble organic solvent, and 0.1-5 weight % of a curing catalyst.

Furthermore, Patent Publication 2 discloses a coating composition characterized by containing a partial condensate of an organic silicon compound formed of 100 parts by weight of trialkoxysilane and 130 parts by weight of tetraalkoxysilane, and silica fine particles. Furthermore, Patent Publication 3 discloses a forming solution, in which silicon alkoxide concentration in terms of $SiO_2$ exceeds 3 mass % and is less than 9 mass %, and which is capable of forming a hard silica-based film by adjusting concentrations of water and acid.

Patent Publication 4 discloses a coating composition containing a copolymer obtained by hydrolysis and polycondensation of 100 parts by weight of alkylalkoxysilane and 0.1-20 parts by weight of tetraalkoxysilane, and silica fine particles, and surface flatness of the film is discussed therein.

On the other hand, means for applying a coating solution on substrate has a great influence on qualities such as hardness, optical distortion, film thickness, etc. of sol-gel film. Although properties of a coating solution impose a great limit on the means for applying the coating solution on substrate, many of conventional techniques dealing with coating solutions for sol-gel films do not raise questions about the application method. In many conventional techniques, it is in fact an assumption to apply a coating solution by using means such as dipping coating method, spin coating method, flow coating method, spray coating method, etc.

Therefore, a coating solution capable of obtaining a sol-gel film of high quality, in terms of not only hardness and transparency, but also external appearance, optical distortion, film thickness, etc., even by an application means capable of application with no equipment, such as hand application, is of great importance from industrial applicability of the above-mentioned sol-gel film. Furthermore, this application means is of great importance from the viewpoint of saving resources too, since transfer efficiency of the coating solution to substrate is high, thereby hardly wasting resources.

Although Patent Publication 5 discloses a coating agent that contains a complex in which an organic polymer compound and a metal oxide are chemically bonded and that is capable of spray coating by hand application or manual operation, there is much room for improvement with respect to wear resistance and weather resistance of a film to be formed, and a further study is necessary.

Patent Publication 1: Japanese Patent Publication Application 2002-228989
Patent Publication 2: Japanese Patent Publication Application 01-306476
Patent Publication 3: Japanese Patent Publication Application 2006-111851
Patent Publication 4: Japanese Patent Publication Application 08-283661
Patent Publication 5: Japanese Patent Publication Application 2001-316635

DISCLOSURE OF THE INVENTION

Task to be Solved by the Invention

To make a coating solution capable of being used for an application process by means such as hand application, it is necessary to control leveling of the coating solution applied on substrate and drying of the solvent by components contained in the coating solution. Unless this control is conducted successfully, the sol-gel film to be obtained tends to have defects such as lines and cracks.

It is a task of the present invention to provide a coating solution capable of obtaining a sol-gel film having good qualities in terms of not only hardness, transparency, but also external appearance, optical distortion, film thickness, etc., even by an application means capable of application with reduced equipment, such as hand application, by examining the components of the coating solution.

Means for Solving Task

A coating solution of the present invention for obtaining sol-gel films is characterized in that it has a solid matter and a solvent, that the solid matter has a silicon oxide oligomer obtained by subjecting an alkoxysilane to hydrolysis and polycondensation in an acid aqueous solution, that the solvent has an organic solvent having a boiling point of 100° C. or higher and a viscosity of 3.5 mPa·s (measurement at 25° C.) or lower and the acid aqueous solution, that number average molecular weight of the silicon oxide oligomer in terms of polystyrene is 500-4000, that the content of the solid matter in the coating solution is 8-30 weight %, and that the content of the silicon oxide oligomer in the solid matter is 10 weight % or greater.

Here, the sol-gel film is a film formed on substrate and refers to a film having a silicon oxide compound obtained by going through the silicon oxide oligomer. Preferably, it has a film thickness of 0.5 μm-5 μm. More preferably, it refers to a film formed by bonding of the silicon oxide compound with substrate through siloxane bond.

Leveling of the coating solution applied on substrate, that is, the degree of achievement of smoothing and homogenization of the thickness of the solid matter forming the sol-gel film has a great influence on the external appearance qualities reflected on linear unevenness of the sol-gel film surface layer, the degree of the size of bubbles contained in the film, the degree of optical distortion of the film, existence or nonexistence of cracks, haze value, etc. Furthermore, cracks tend to more easily occur by trying to obtain a thicker film. Therefore, a technical barrier becomes higher. In the present invention, this degree of achievement of smoothing and homogenization is sometimes written as "leveling property".

In the application means such as hand application, a higher leveling property is required of the coating solution due to the production process. Therefore, it is required to be achieved by optimization of the coating solution components. As a result of discussing the factors influencing leveling property in the present invention, we have obtained findings that the volatilization rate of the solvent of the coating solution, viscosity of the coating solution, the solid matter concentration of the coating solution, etc. influence leveling property of the coating solution applied. Then, in particular, we have obtained findings that, if viscosity of the coating solution is 7 mPa·s or less, a sol-gel film having a superior leveling property and a good quality tends to be obtained. Furthermore, viscosities in the present invention signify those all measured at 25° C.

Then, we have achieved a coating solution capable of obtaining a high-quality sol-gel film by making the form and the content of solid matter in the coating solution and the type of the solvent appropriate, even by an application means capable of application with reduced equipment, such as hand application.

In the present invention, in solid matter of the coating solution, number average molecular weight of the silicon oxide oligomer in terms of polystyrene is made to be 500-4000, preferably 500-3000. The solid matter content of the coating solution is made to be 8-30 weight %, preferably 9-25 weight %. The silicon oxide oligomer content of the solid matter is made to be 10 weight % or greater, preferably 20 weight % or greater.

If the solid matter content of the coating solution is less than 8 weight %, repelling defect of the coating solution tends to occur. If the solid matter exceeds 30 weight %, viscosity of the coating solution becomes high, and leveling property tends to become inferior.

Furthermore, number average molecular weight of the silicon oxide oligomer is made to be 500-4000. In case that number average molecular weight exceeds 4000, viscosity of the coating solution tends to exceed 7 mPa·s, and lowering of leveling property is found. Furthermore, under a condition that hydrolysis reaction of alkoxysilane proceeds, polycondensation reaction also proceeds at the same time. Therefore, it is difficult to control number average molecular weight to be less than 500. Furthermore, number average molecular weight mentioned here signifies number average molecular weight calculated in terms of polystyrene in gel permeation chromatography (GPC) analysis.

The coating solution of the present invention has an organic solvent that boiling point is 100° C. or higher and that viscosity is 3.5 mPa·s or lower, as the solvent. Evaporation of the solvent of the coating solution applied on substrate becomes slow by increasing the content of an organic solvent having a boiling point of 100° C. or higher in the coating solution. With this, the time during which it is subjected to leveling can be adjusted. However, many of chemical species satisfying an organic solvent having a boiling point of 100° C. or higher are normally high in viscosity. Therefore, it actually can be a factor to lower leveling property. In the present invention, as the organic solvent, one having a viscosity of 3.5 mPa·s or lower, preferably 2.5 mPa·s or lower, is used, from findings obtained by discussing a factor affecting the influence of leveling property. With this, we have reached the improvement of leveling property without increasing viscosity of the coating solution.

Furthermore, in the present invention, hand application refers to a technical means for applying the coating solution onto substrate with at least one means selected from a means for bringing a member holding the coating solution into contact with substrate and a means for spreading the coating solution with a member after supplying the coating solution onto substrate. As a member for holding the coating solution and as a member for spreading the coating solution, it is possible to mention cloth, paper, nonwoven fabric, gauze, sponge, felt, etc. As a means for bringing the member into contact with substrate and as a means for spreading the coating solution, there are ones by human hand, ones by robots and machines, etc.

Advantageous Effect of the Invention

The coating solution of the present invention for obtaining sol-gel films is superior in leveling property upon application on substrate, and it is possible to efficiently apply the coating solution onto substrate. It becomes successful in forming visually homogeneous sol-gel films with low costs onto substrates for window glasses or for mirrors used in carriers such as automobiles, buildings, industrial equipment, electrical appliances, etc., or onto substrates used for display devices, semiconductor substrates, etc.

Furthermore, the coating solution of the present invention is capable of forming visually homogeneous sol-gel films even by hand application. Therefore, the shape of substrate to be coated may be either flat surface or curved surface.

BEST MODE FOR CARRYING OUT THE INVENTION

The coating solution for obtaining sol-gel films is characterized in that it has a solid matter and a solvent, that the solid matter has a silicon oxide oligomer obtained by subjecting an alkoxysilane to hydrolysis and polycondensation in an acid aqueous solution, that the solvent has an organic solvent having a boiling point of 100° C. or higher and a viscosity of 3.5 mPa·s (measurement at 25° C.) or lower and the acid aqueous solution, that number average molecular weight of the silicon oxide oligomer in terms of polystyrene is 500-4000, that the content of the solid matter in the coating solution is 8-30 weight %, and that the content of the silicon oxide oligomer in the solid matter is 10 weight % or greater.

The solvent in the present invention has an acid aqueous solution and an organic solvent. As the acid aqueous solution, it is preferable to select an aqueous solution having an acid catalyst, such as inorganic acid such as hydrochloric acid, sulfuric acid, nitric acid or the like, or organic acid such as acetic acid, phthalic acid, succinic acid or the like, etc., according to hydrolysis rate of alkoxy group of the alkoxysilane used. Then, it is preferable to add the acid catalyst to have a pH value of 1 to 5 in the solution upon hydrolysis and polycondensation of the alkoxysilane, that is, in the solution having the silicon oxide oligomer (the solution having the silicon oxide oligomer is sometimes expressed as "silica sol solution").

For example, in case that tetraethoxysilane and methyltriethoxysilane are used as the starting raw materials, pot life becomes long if pH value is around 2. Therefore, it is preferable to adjust pH value to 1.5-2.5. It is preferable to use a weak acid having a low acid dissociation constant, which makes setting of the pH value easy, such as acetic acid, phthalic acid, etc., as the acid catalyst.

Furthermore, a weak acid having a low acid dissociation constant, such as acetic acid, phthalic acid, etc., has a small pH value variation, even if the water content of the coating solution changes, as compared with a strong acid such as hydrochloric acid, sulfuric acid, nitric acid, etc. Therefore, it is preferable since variation of pH value becomes small, even in the case of using a coating method by bringing a member holding the coating solution into contact with substrate, and even if the acid catalyst concentration changes by the occurrence of evaporation and drying of the organic solvent and water contained in the coating solution during the application step.

The organic solvent is preferably one having a boiling point of 100° C. or higher and a viscosity of 3.5 mPa·s or lower (hereinafter a solvent component having a boiling point of 100° C. or higher may be expressed as "high-boiling-point solvent". As such examples, it is possible to mention 2-methoxyethanol, 2-ethoxyethanol, 2-isopropoxyethanol, 2-butoxyethanol, diethylene glycol monomethyl ether, 1-methoxy-2-propanol, 1-ethoxy-2-propanol, dipropylene glycol monomethyl ether, dipropylene glycol monoethyl ether, diacetone alcohol, 2-methoxyethyl acetate, 2-ethoxyethyl acetate, 2-butoxyethyl acetate, diethylene glycol monoethyl ether acetate, etc.

Furthermore, the solvent preferably has high compatibility with water and more preferably is a solvent having infinite solubility in water, since it is well mixed with the acid aqueous solution added to the coating solution. As examples of a solvent having a boiling point of 100° C. or higher, a viscosity of 3.5 mPa·s or lower, and infinite solubility in water, it is possible to mention 2-methoxyethanol, 2-ethoxyethanol, 2-isopropoxyethanol, 2-butoxyethanol, diethylene glycol monomethyl ether, 1-methoxy-2-propanol, 1-ethoxy-2-propanol, dipropylene glycol monomethyl ether, dipropylene glycol monoethyl ether, diacetone alcohol, 2-methoxyethyl acetate, diethylene glycol monoethyl ether acetate, etc.

The upper limit of boiling point and the lower limit of viscosity of the organic solvent are not particularly limited. The upper limit of boiling point of the organic solvent may be 300° C., preferably 250° C., more preferably 200° C. The lower limit of viscosity of the organic solvent may be 0.01 mPa·s, preferably 0.1 mPa·s, more preferably 0.4 mPa·s.

Furthermore, in the present invention, it is preferable that the solvent has an alcohol having a carbon number of 3 or less (hereinafter it is sometimes expressed as "lower alcohol"). This is because a lower alcohol improves wettability to substrate. In the case of having an alcohol having a carbon number of 3 or less, it is preferable to adjust the amount of the organic solvent (i.e., high-boiling-point solvent) to 0.4-6 times, preferably 0.7-4 times, that of the lower alcohol by weight ratio. Examples of this lower alcohol are methyl alcohol, ethyl alcohol, n-propyl alcohol, and isopropyl alcohol. Then, this lower alcohol may be a lower alcohol that has been generated by hydrolysis of the alkoxysilane.

The solvent of the present invention has an acid aqueous solution and a high-boiling-point solvent. As a preferable mode, it further has a lower alcohol. In case that an acid aqueous solution and a high-boiling-point solvent are main components of the solvent, it is preferable that the amount of the main components of the solvent is 0.5-1 time, preferably 0.7-1 time, the total amount of the solvent in order to keep viscosity of the coating solution low. Of this, the amount of the acid aqueous solution needs to be an amount for securing the amount of water necessary for hydrolysis reaction of the alkoxysilane. It is preferable to make the amount of the acid aqueous solution 0.01-0.8 times, preferably 0.1-0.5 times, the total amount of the solvent so that the amount of water contained in the coating solution is preferably by molar ratio 5 or more times, furthermore 7 or more times, and 20 or less times the amount of the alkoxysilane As the alkoxysilane used in the coating solution of the present invention, it is preferable to use at least one kind selected from trialkoxysilane or tetraalkoxysilane. In the hydrolysis and polycondensation product from trialkoxysilane, the number of siloxane bonds [—Si—O—Si—] forming a network structure becomes 3 per one silicon. A polycondensate formed from this generates a spatial room in the structure of the polycondensate for organic groups that are attached to silicon atoms, while forming a network crosslinking by siloxane network. Therefore, stress developed upon gelation is relatively small, and cracks hardly occur in the film formed.

In the case of using an alkoxysilane having two or less of reaction active groups, it generates more a spatial room in the structure of the polycondensate, as compared with using three of those, but it forms only a chain-like network. Therefore, there is a tendency that wear resistance and the like of the film obtained lower.

Furthermore, in the case of using a film obtained by the present invention in uses that need to have a sufficient wear resistance in practical use, for example, windows such as for buildings and vehicles, it is preferable to have a higher degree of crosslinking density of a silicon compound formed from the silicon oxide oligomer. Therefore, as the alkoxysilane, it is preferable to use tetraalkoxysilane, which forms four of siloxane bonds.

The use of tetraalkoxysilane works well for forming a film high in wear resistance. This is because crosslinking density of the film becomes higher due to the formation of four of siloxane bonds by tetraalkoxysilane.

The use of the chemical species, however, tends to make a spatial room in the crosslinking structure smaller upon gelation during the film forming process. Therefore, cracks tend to occur in the film. In view of this, as one of the alkoxysilanes used, it is necessary to use trialkoxysilane. Then, it is preferable in the coating solution to make an adjustment so that the weight ratio of a silicon oxide oligomer derived from trialkoxysilane to a silicon oxide oligomer derived from the tetraalkoxysilane becomes 20:80 to 50:50, preferably 25:75 to 40:60. This makes it possible to obtain a film having a hardness of 8H or greater in a pencil hardness test conforming to "JIS K 5600-5-4 (1999)".

As the trialkoxysilane, it is possible to use methyltrimethoxysilane, ethyltrimethoxysilane, propyltrimethoxysilane, isopropyltrimethoxysilane, butyltrimethoxysilane, isobutyltrimethoxysilane, phenyltrimethoxysilane, methyltriethoxysilane, ethyltriethoxysilane, propyltriethoxysilane, isopropyltriethoxysilane, butyltriethoxysilane, isobutyltriethoxysilane, phenyltriethoxysilane, methyltripropoxysilane, ethyltripropoxysilane, propyltripropoxysilane, isopropyltripropoxysilane, butyltripropoxysilane, isobutyltripropoxysilane, phenyltripropoxysilane, methyltriisopropoxysilane, ethyltriisopropoxysilane, propyltriisopropoxysilane, isopropyltriisopropoxysilane, butyltriisopropoxysilane, isobutyltriisopropoxysilane, phenyltriisopropoxysilane, etc.

Furthermore, it is also possible to provide some functions by an organic group that is chemically bonded except three alkoxy groups. For example, it is possible to use 3-glycidoxypropyltrimethoxysilane, 3-glycidoxypropyltriethoxysilane, 5,6-epoxyhexyltrimethoxysilane, 5, 6-epoxyhexyltriethoxysilane, 2-(3,4-epoxycyclohexyl)ethyltrimethoxysilane, 2-(3, 4-epoxycyclohexyl)ethyltriethoxysilane, 3-oxetanylpropyltrimethoxysilane, 3-oxetanylpropyltriethoxysilane, etc., which have epoxy group and oxetanyl group, for the purpose of improving wear resistance.

As the tetraalkoxysilane, it is possible to use tetramethoxysilane, tetraethoxysilane, tetrapropoxysilane, tetraisopropoxysilane, etc. Then, as each of the tri- and tetra-alkoxysilanes, it is possible to use a single compound or a plurality of compounds.

Furthermore, the coating solution of the present invention may contain fine particles having an average particle diameter of 10 to 200 nm for the purpose of providing the sol-gel film with various functions and for the purpose of improving wear resistance and crack resistance of the film. In this case, it is preferable to adjust the fine particles having a particle diameter of 10 to 200 nm, which are contained in the coating solution, to 0.1-200 parts by weight relative to 100 parts by weight of the silicon oxide oligomer component in the coating solution.

It is preferable that the fine particles are homogeneously dispersed without aggregation of the fine particles powder in the coating solution. To disperse the fine particles powder, they may be previously dispersed in dispersion medium to form a dispersion liquid, followed by mixing with the coating solution, or the dispersion may be conducted in the coating solution. To disperse the fine particles, it is possible to use a method such as ball mill, jet mill, bead mill, sand mill, ultrasonic dispersion method, etc. Average particle diameter of the fine particles mentioned here is obtained by measuring number average particle diameter in the liquid by dynamic light scattering method.

As the fine particles, it is possible to use oxide fine particles such as silicon oxide, titanium oxide, aluminum oxide, zirconium oxide, zinc oxide, ITO, ATO, etc., metal fine particles such as iron, gold, silver, copper, etc., and the like. These fine particles are capable of providing the film with various functions. In particular, it is known that ITO efficiently blocks near infrared rays of wavelengths of 1000 nm or longer, and therefore an ITO-containing coating solution is useful as a coating solution for producing an infrared-cutting film. Furthermore, in some cases, the fine particles contribute to the improvement of wear resistance and crack resistance of the film.

Furthermore, it is known that zinc oxide efficiently blocks ultraviolet rays of wavelengths of 380 nm or shorter, and therefore a coating solution containing zinc oxide fine particles is useful as a coating solution for producing an ultraviolet-cutting film. Still furthermore, as a material for blocking ultraviolet rays, it may contain titanium oxide fine particles, cerium oxide fine particles, benzophenone-series molecules, or benzotriazole-series molecules, etc.

Furthermore, in case that the coating solution contains a dye, organic pigment, inorganic pigment, or metal fine particles having absorption in visible region, it can be used as a coating solution for producing a colored film.

Furthermore, an organic, inorganic, or organic-inorganic hybrid functional molecule may be added for the purpose of providing a film, which is formed from the coating solution of the present invention, with functionality.

Furthermore, a leveling agent may be added in a small amount to the coating solution for the purpose of improving leveling property of the coating solution. As the leveling agent, it is possible to select a leveling agent such as surfactant-series, silicone-series, etc. In view of compatibility with the coating solution of the present invention, it is preferable to use a water-soluble leveling agent.

Furthermore, when the coating solution is formed, the coating solution may be formed by further adding a metal complex as a curing catalyst. Addition of the curing catalyst is preferable, since it improves hardness and wear resistance of the sol-gel film obtained. The curing catalyst may be added in an amount by weight ratio that is up to 0.05 times that of the silicon oxide oligomer in the coating solution. If it exceeds the amount that is 0.05 times, there is a tendency that the catalytic effect relative to the amount added becomes weak. Therefore, it is not necessary to add a large amount of the catalyst. On the other hand, it is preferable to add the curing agent in an amount by weight ratio that is 0.0001 times that of the silicon oxide oligomer in the treatment agent.

As the curing catalyst, a metal complex such as tin, aluminum, titanium, zirconium, etc. is more preferably used. Here, the metal complex is preferably a fluoride, chloride, bromide, iodide, acetate, nitrate, sulfate, acetylacetonate salt, etc.

Since the coating solution of the present invention is high in leveling property, it is possible to form on substrate a sol-gel film that is a relatively thick film having a film thickness of 0.5-5 μm, that optical distortion is 1 minute or less, and that is superior in not only transparency, but also external appearance, hardness, durability, etc., even by using a means, such as hand application, that is difficult to obtain a sol-gel film having flat surface and less optical distortion. Furthermore, it is natural that the application on substrate is possible even by using a means that is relatively easy in smoothing and homogenization, such as spin coating, dip coating, flow coating, spray coating, etc.

Furthermore, the above-mentioned optical distortion is defined by the method described in item of 3.12 Optical distortion test of "JIS R 3212 (1998). In the measurement of optical distortion by the method defined in the present invention, the measurement is conducted with substrate and film. However, in case that optical distortion of the substrate is low to be 0.5 minutes or less, the measured value obtained with the substrate having the film formed thereon may be considered as optical distortion of the film. Furthermore, in case that optical distortion of the substrate exceeds 0.5 minutes, the substrate is processed to be thin so that optical distortion of the substrate is made to be small to 0.5 minutes or less. Alternatively, it is optional that a substrate having a sol-gel film formed thereon is formed by a substrate having an optical distortion of 0.5 minutes or less by the same method, and that optical distortion obtained from the substrate is used as optical distortion of the film.

In case that the coating solution of the present invention is applied onto substrate by hand application, the coating solution is applied onto substrate by holding the coating solution by means such as impregnation, penetration, etc. of the coating solution into a member such as cloth, sponge, brush, brush, nonwoven fabric, etc. and by bringing the member into contact with the substrate by robot, human hands, etc. Alternatively, it is optional that the coating solution is supplied to substrate, then a member such as cloth, sponge, brush, brush, nonwoven fabric, etc is brought into contact with the coating solution, and then the coating solution supplied is spread. Furthermore, a combination of these is acceptable.

Then, the substrate to be coated with the coating solution of the present invention is not particularly limited. For example, in the case of glass substrate, it is possible to use an inorganic transparent plate glass such as window or mirror, for instance, for building use or vehicle use, float plate glass used for display, or soda-lime glass, alkali-free glass, etc. produced by roll-out method. It is possible to use both of a colorless one and a colored one for the plate glass. There is no particular limitation in combination with another functional film, glass shape, etc.

As the shape of substrate, flat plate or curved plate is not questioned. Furthermore, it is also possible to use wire glass besides various tempered glasses such as air-quench tempered glass, chemically strengthened glass, etc. Furthermore, it is possible to use various glass substrates such as borosilicate glass, low-expansion glass, zero-expansion glass, low-expansion glass-ceramics, zero-expansion glass-ceramics, TFT glass, PDP glass, substrate glass for optical filters, etc.

Furthermore, besides glass substrate, it is optional to use a resin substrate such as polyethylene terephthalate resin, polycarbonate resin, polycarbonate resin, polyvinyl chloride resin, polyethylene resin, etc.

Furthermore, the substrate to be coated with the coating solution of the present invention may have on its coating surface a film formed thereon. For example, in case that a film (underlying film) formed on the coating surface of the substrate is inferior in chemical durability, there is an effect of preventing the underlying film from receiving damages from water, acid, alkali, etc, since a film formed from the coating solution of the present invention is formed into a thick film without generating cracks. Furthermore, in case that the underlying film is inferior in scratch resistance, a film formed from the coating solution of the present invention has an effect of preventing the underlying film from having scratches.

Still furthermore, it is optional to further form a film on a film formed from the coating solution of the present invention.

Next, an exemplary procedure for conducting the present invention is explained. The coating solution is obtained by mixing and stirring a predetermined amount of a water containing alkoxysilane, an organic solvent having a boiling point of 100° C. or higher and a viscosity of 3.5 mPa·s or lower, acid catalyst, etc. The time for the stirring is preferably 10 minutes to 20 days, particularly preferably 1 hour to 4 days. It is, however, not limited to this, in case that the stirring is conducted at apart from room temperature. In the case of heating, it is possible to accelerate the reaction and shorten the stirring time.

As above, hydrolysis of the alkoxysilane can be conducted by adding a sufficient amount of water and acid catalyst, and it is necessary to make the reaction proceed sufficiently. On the other hand, at the same time when the hydrolysis reaction occurs, the hydrolysate generates a polycondensation reaction, which is a dehydration reaction. In the case of viewing from the viewpoint of viscosity of the coating solution and wear resistance of the film, the progress of the polycondensation reaction is not preferable. Therefore, it is desirable to make a coating solution containing water in an amount by mol that is 5 or more times, preferably 7 or more times, that of alkoxysilane prior to the start of the reaction so that the hydrolysis reaction proceeds, but the polycondensation reaction hardly proceeds.

Here, in the case of using two or more types of alkoxysilanes, it is optional to separately conduct the hydrolysis reactions and then mix them together, or conduct them together. Furthermore, as another example for preparing the coating solution, there is a method of gradually mixing one prepared by diluting alkoxysilane with solvent as above, with acid aqueous solution diluted with solvent. This example makes it possible to avoid a rapid reaction and makes it easy to obtain a more homogeneous reaction.

Then, the prepared coating solution is applied onto substrate and dried. As the drying atmosphere, drying at room temperature may be conducted. It is, however, desirable to conduct baking at 50-300° C., if the sol-gel film needs higher wear resistance and hardness. With this, the sol-gel film becomes a film having a hardness of 8 H or greater in pencil hardness.

EXAMPLES

In the following, examples of the present invention are explained.

[Sol-Gel Film Evaluation Method]

(1) External Appearance Evaluation

External appearance, transparency, and cracks existence or nonexistence of the sol-gel film were evaluated by visual inspection. One with no problem was judged as satisfactory (A), and one with problem was judged as unsatisfactory (B).

(2) Optical Distortion

A test was conducted in accordance with "3.12 Optical distortion test" of "JIS R 3212 (1998)". 1 minute or less was judged as being a distortion that makes it possible to be used as a glass product for building use, vehicle use, and the like.

(3) Pencil Hardness Test

A pencil hardness test was conducted in accordance with "JIS K 5600-5-4 (1999)" by using Uni (6B to 9H) made by Mitsubishi Pencil Co., Ltd. 6H or greater was judged as a useful hardness as that of a glass product for building use, vehicle use, and the like, and 8H or greater was judged as a superior hardness.

(4) Film Thickness

The film was cut out with a utility knife, and the step measurement was conducted by using SURFCORDER ET4000A made by Kosaka Laboratory Ltd.

(5) Measurement of Number Average Molecular Weight of Silicon Oxide Oligomer

The measurement was conducted by using gel-permeation chromatography made by Tosoh Corporation, and number average molecular weight (Mn) in terms of polystyrene was calculated.

Example 1

(Preparation of Coating Solution)

There were mixed together 7.28 g of tetraethoxysilane (TEOS), 2.39 g of methyltriethoxysilane (MTES), 4.23 g of 1-ethoxy-2-propanol (1E2P), and 6.10 g of 0.5N acetic acid (the amount of water was 8 times by mol that of TEOS+MTES), followed by stirring at 30° C. for 16 hours, thereby obtaining a coating solution. 1-ethoxy-2-propanol has a boiling point of 132.2° C. and a viscosity of 1.9 mPa·s.

Properties of the coating solution are shown in Table 1. The silicon oxide oligomer content of the coating solution was 15 weight %. The oligomer had a number average molecular weight of 2108 and a viscosity of 5.6 mPa·s. Furthermore, the weight ratio of a silicon oxide oligomer component derived from MTES to a silicon oxide oligomer component derived from TEOS was 30:70. Furthermore, in Table 1, the silicon oxide oligomer content of the coating solution was written as "silicon oxide amount in coating solution", and the silicon oxide oligomer content of the solid matter was written as "silicon oxide amount in solid matter". Furthermore, the proportion of the silicon oxide oligomer component is shown in Table 1 by weight proportion.

(Preparation of Substrate Having Sol-Gel Film Formed Thereon)

A surface of a glass substrate of 300mm×300mm×3.45mm (thickness) was ground with a grinding solution, followed by washing with water and drying. The grinding solution used here is a 2 weight % ceria suspension prepared by mixing a glass abrasive, MILEK A(T) (made by MITSUI MINING & SMELTING CO., LTD.), with water.

A nonwoven fabric impregnated with 3 g of the coating solution was brought into contact with the substrate by hand operation, and the treatment agent applied was sufficiently spread over the entire surface on one side of the substrate. As a result, although there was a small loss by impregnation to the nonwoven fabric, almost all the amount was adhered onto the substrate. The application was conducted at a temperature of 25° C. and a humidity of 45% RH.

Then, a baking was conducted at 200° C. for 10 minutes, followed by cooling to room temperature, thereby obtaining a substrate having a sol-gel film having a superior external appearance formed thereon. Property values of the obtained substrate having the sol-gel film formed thereon are shown in Table 1. Since it was 0.5 minutes or less in optical distortion test and 8H in pencil hardness test, it was at a practical level as a glass product for building use, vehicle use, etc.

Example 3

There were mixed together 6.24 g of tetraethoxysilane (TEOS), 1.70 g of γglycidoxypropyltrimethoxysilane (GPTMS), 6.71 g of 1-ethoxy-2-propanol, and 5.35 g of 0.5N acetic acid (the amount of water was 8 times by mol that of TEOS+GPTMS), followed by stirring at 30° C. for 16 hours, thereby obtaining a coating solution. Example 1 was repeated except in that the silicon oxide oligomer component was changed. As a result, there was obtained a substrate having a

TABLE 1

| | Solid matter content of coating solution | Silicon oxide amount in coating solution | Proportions of silicon oxide oligomer components | | | Other solid matter amount in coating solution | Silicon oxide amount in solid matter |
|---|---|---|---|---|---|---|---|
| | | | MTES | GPTMS | TEOS | | |
| Example 1 | 15 wt % | 15 wt % | 30 | — | 70 | — | 100 wt % |
| Example 2 | 15 wt % | 15 wt % | — | 30 | 70 | — | 100 wt % |
| Example 3 | 15 wt % | 15 wt % | — | 40 | 60 | — | 100 wt % |
| Example 4 | 10 wt % | 10 wt % | — | 30 | 70 | — | 100 wt % |
| Example 5 | 20 wt % | 10 wt % | — | 30 | 70 | ITO fine particles 10 wt % | 50 wt % |
| Example 6 | 20 wt % | 10 wt % | — | 30 | 70 | SiO₂ fine particles 10 wt % | 50 wt % |
| Example 7 | 15 wt % | 15 wt % | 80 | — | 20 | — | 100 wt % |
| Comp. Ex. 1 | 5 wt % | 5 wt % | — | 30 | 70 | — | 100 wt % |
| Comp. Ex. 2 | 15 wt % | 15 wt % | — | 40 | 60 | — | 100 wt % |
| Comp. Ex. 3 | 15 wt % | 15 wt % | — | 30 | 70 | — | 100 wt % |
| Comp. Ex. 4 | 15 wt % | 15 wt % | 10 | — | 90 | — | 100 wt % |

| | Molecular weight (Mn) | Solvent | Viscosity (mPa·s) | Baking temp. | External appearance | Optical distortion | Pencil hardness | Film thickness (μm) |
|---|---|---|---|---|---|---|---|---|
| Example 1 | 2108 | 1E2P 21 wt % | 5.6 | 200° C. | A | 0.5 min or less | 8H | 1.5 |
| Example 2 | 2303 | 1E2P 35 wt % | 6.5 | 200° C. | A | 0.5 min or less | 9H | 1.6 |
| Example 3 | 2147 | 1E2P 34 wt % | 5.9 | 200° C. | A | 0.5 min or less | 8H | 0.8 |
| Example 4 | 2092 | 1E2P 52 wt % | 4.3 | 200° C. | A | 0.5 min or less | 9H | 0.6 |
| Example 5 | 2303 | 1E2P 19 wt % | 5.4 | 200° C. | A | 0.5 min or less | 9H | 1.4 |
| Example 6 | 2303 | 1E2P 19 wt % | 5.8 | 200° C. | A | 0.5 min or less | 9H | 1.5 |
| Example 7 | 1051 | 1E2P 27 wt % | 5.2 | 200° C. | A | 0.5 min or less | 6H | 1.7 |
| Comp. Ex. 1 | 1884 | 1E2P 76 wt % | 2.9 | 200° C. | B Repelling | — | — | — |
| Comp. Ex. 2 | 5214 | 1E2P 36 wt % | 7.9 | 200° C. | B Linear unevenness | 2 min | 8H | 1.5 |
| Comp. Ex. 3 | 2271 | EtOH 21 wt % | 4.6 | 200° C. | B Linear unevenness | 3 min | 8H | 1.3 |
| Comp. Ex. 4 | 2882 | 1E2P 18 wt % | 6.8 | 200° C. | B Cracks | — | — | — |

Example 2

There were mixed together 7.28 g of tetraethoxysilane (TEOS), 1.27 g of γ-glycidoxypropyltrimethoxysilane (GPTMS), 5.63 g of 1-ethoxy-2-propanol, and 5.82 g of 0.5N acetic acid (the amount of water was 8 times by mol that of TEOS+GPTMS), followed by stirring at 30° C. for 16 hours, thereby obtaining a coating solution. Example 1 was repeated except in that GPTMS was used in place of MTES. As a result, there was obtained a substrate having a sol-gel film having a good external appearance, which was formed thereon. Properties of the coating solution and property values of the obtained substrate having the sol-gel film formed thereon in the present example are shown in Table 1.

sol-gel film having a good external appearance, which was formed thereon. Properties of the coating solution and property values of the obtained substrate having the sol-gel film formed thereon in the present example are shown in Table 1.

Example 4

There were mixed together 4.85 g of tetraethoxysilane (TEOS), 1.70 g of γ-glycidoxypropyltrimethoxysilane (GPTMS), 6.71 g of 1-ethoxy-2-propanol, and 5.35 g of 0.5N acetic acid (the amount of water was 8 times by mol that of TEOS+GPTMS), followed by stirring at 30° C. for 16 hours, thereby obtaining a coating solution. Example 1 was repeated except in that the silicon oxide oligomer component was changed. As a result, there was obtained a substrate having a sol-gel film having a good external appearance, which was formed thereon. Properties of the coating solution and property values of the obtained substrate having the sol-gel film formed thereon in the present example are shown in Table 1.

Example 5

There were mixed together 7.28 g of tetraethoxysilane (TEOS), 1.27 g of γ-glycidoxypropyltrimethoxysilane (GPTMS), 5.63 g of 1-ethoxy-2-propanol, and 5.82 g of 0.5N acetic acid (the amount of water was 8 times by mol that of TEOS+GPTMS), followed by stirring at 30° C. for 16 hours, thereby obtaining a sol solution. Then, 10 g of the sol solution was mixed with 5 g of a solution (the content of ITO ultrafine particles: 30 weight %, solvent: isopropyl alcohol; ITO fine particle dispersion liquid (30 weight %) made by Mitsubishi Materials Corporation) having ITO ultrafine particles having an average particle diameter of 60 nm and dispersed therein, thereby obtaining a coating solution. Solid matter content of the coating solution was 20 weight %, and the amount of silicon oxide oligomer component was 10 weight %. The amount of silicon oxide in the solid matter was 50 weight %, and viscosity was 5.4 mPa·s. The others were the same as those of Example 1.

As a result, there was obtained a substrate having a sol-gel film having a good external appearance, which was formed thereon. Properties of the coating solution and property values of the obtained substrate having the sol-gel film formed thereon in the present example are shown in Table 1.

Example 6

There were mixed together 7.28 g of tetraethoxysilane (TEOS), 1.27 g of γ-glycidoxypropyltrimethoxysilane (GPTMS), 5.63 g of 1-ethoxy-2-propanol, and 5.82 g of 0.5N acetic acid (the amount of water was 8 times by mol that of TEOS+GPTMS), followed by stirring at 30° C. for 16 hours, thereby obtaining a sol solution. Then, 10 g of the sol solution was mixed with 5 g of a solution (the content of $SiO_2$ ultrafine particles: 30 weight %, solvent: isopropyl alcohol; $SiO_2$ fine particle dispersion liquid (30 weight %) made by NISSAN CHEMICAL INDUSTRIES, LTD.) having $SiO_2$ ultrafine particles having an average particle diameter of 60 nm and dispersed therein, thereby obtaining a coating solution. Solid matter content of the coating solution was 20 weight %, and the amount of silicon oxide oligomer component derived from the alkoxysilane was 10 weight %. The amount of silicon oxide in the solid matter was 50 weight %, and viscosity was 5.8 mPa·s. The others were the same as those of Example 1.

As a result, there was obtained a substrate having a sol-gel film having a good external appearance, which was formed thereon. Properties of the coating solution and property values of the obtained substrate having the sol-gel film formed thereon in the present example are shown in Table 1.

Example 7

There were mixed together 3.12 g of tetraethoxysilane (TEOS), 5.58 g of methyltriethoxysilane (MTES), 5.46 g of 1-ethoxy-2-propanol, and 5.84 g of 0.5N acetic acid (the amount of water was 8 times by mol that of TEOS+GPTMS), followed by stirring at 30° C. for 16 hours, thereby obtaining a coating solution. Example 1 was repeated except in that the silicon oxide oligomer component was changed. As a result, there was obtained a substrate having a sol-gel film having a good external appearance, which was formed thereon. Properties of the coating solution and property values of the obtained substrate having the sol-gel film formed thereon in the present example are shown in Table 1.

Comparative Example 1

There were mixed together 2.43 g of tetraethoxysilane (TEOS), 0.42 g of γ-glycidoxypropyltrimethoxysilane (GPTMS), 15.21 g of 1-ethoxy-2-propanol, and 1.94 g of 0.5N acetic acid (the amount of water was 8 times by mol that of TEOS+GPTMS), followed by stirring at 30° C. for 16 hours, thereby obtaining a coating solution. Example 1 was repeated except in that concentration of the silicon oxide oligomer was changed. Properties of the coating solution in the present comparative example are shown in Table 1.

In the present comparative example, the solid matter content of the coating solution was 5 weight %. Then, when the application was conducted in the same manner as that of Example 1, the coating solution was repelled by the glass substrate. With this, it was not possible to obtain a good film.

Comparative Example 2

There were mixed together 6.24 g of tetraethoxysilane (TEOS), 1.70 g of γ-glycidoxypropyltrimethoxysilane (GPTMS), 6.71 g of 1-ethoxy-2-propanol, and 5.35 g of 0.5N acetic acid (the amount of water was 8 times by mol that of TEOS+GPTMS), followed by stirring at 30° C. for 40 hours, thereby obtaining a coating solution. Example 3 was repeated except in that number average molecular weight changed by changing the stirring time. Properties of the coating solution and property values of the substrate, on which the coating solution had been applied, in the present comparative example are shown in Table 1.

Viscosity of the coating solution was 7.9 mPa·s, which was higher than that of Example 1. When the application was conducted in the same manner as that of Example 1, linear unevenness (linear unevenness) was found on the film in the wiping direction of nonwoven fabric. When the optical distortion test was conducted, it was large to be 2 minutes.

Comparative Example 3

There were mixed together 7.28 g of tetraethoxysilane (TEOS), 1.27 g of γ-glycidoxypropyltrimethoxysilane (GPTMS), 5.63 g of ethanol, and 5.82 g of 0.5N acetic acid (the amount of water was 8 times by mol that of TEOS+GPTMS), followed by stirring at 30° C. for 16 hours, thereby obtaining a coating solution. The present comparative example was different from Example 2 in that 1-ethoxy-2-propanol was changed to ethanol. Ethanol had a boiling point of 78.0° C. and a viscosity of 1.1 mPa·s. Viscosity of the coating solution was 4.6 mPa·s. When the application was conducted in the same manner as that of Example 1, linear unevenness (linear unevenness) was found on the film in the wiping direction of nonwoven fabric. When the optical distortion test was conducted, it was large to be 3 minutes. Properties of the coating solution and property values of the substrate, on which the coating solution had been applied, in the present comparative example are shown in Table 1.

Comparative Example 4

There were mixed together 9.36 g of tetraethoxysilane (TEOS), 0.80 g of methyltriethoxysilane (MTES), 3.61 g of 1-ethoxy-2-propanol, and 6.23 g of 0.5N acetic acid (the amount of water was 8 times by mol that of TEOS+MTES), followed by stirring at 30° C. for 16 hours, thereby obtaining a coating solution. Example 1 was repeated except in that the silicon oxide oligomer component was changed. Properties of the coating solution and property values of the substrate, on which the coating solution had been applied, in the present comparative example are shown in Table 1.

The weight ratio of the silicon oxide oligomer component derived from MTES to the silicon oxide oligomer component derived from TEOS of the coating solution was 10:90. When the application was conducted in the same manner as that of Example 1, cracks occurred in the film. Thus, it was not possible to obtain a good film.

The invention claimed is:

1. A coating solution for obtaining sol-gel films, said coating solution being that the coating solution has a solid matter and a solvent, wherein:
    the solid matter has a silicon oxide oligomer obtained by subjecting an alkoxysilane to hydrolysis and polycondensation in an acid aqueous solution,
    the solvent has an organic solvent having a boiling point of 100° C. or higher and a viscosity of 3.5 mPa·s or lower and the acid aqueous solution,
    the number average molecular weight of the silicon oxide oligomer in terms of polystyrene is 500-4000,
    the content of the solid matter in the coating solution is 8-30 weight %,
    the content of the silicon oxide oligomer in the solid matter is 10 weight % or greater,
    the alkoxysilane comprises trialkoxysilane and tetraalkoxysilane, and
    the weight ratio of a silicon oxide oligomer derived from the trialkoxysilane to a silicon oxide oligomer derived from the tetraalkoxysilane is 20:80 to 50:50.

2. A coating solution according to claim 1, wherein the coating solution comprises an alcohol having a carbon atom number of 3 or less, and the organic solvent is in an amount that is 0.4 to 6 times that of the alcohol by weight.

3. A coating solution according to claim 1, wherein water contained in the coating solution is in an amount that is 5 or more times that of the alkoxysilane by mol.

4. A coating solution according to claim 1, wherein the solid matter comprises fine particles having an average particle diameter of 10 to 200 nm.

5. A method for producing a sol-gel film, comprising the step of applying a coating solution according to claim 1 onto substrate.

6. A method for producing a sol-gel film according to claim 5, wherein a means for applying the coating solution onto the substrate is at least one selected from the group consisting of a means for bringing a member holding the coating solution into contact with the substrate, and a means for spreading the coating solution with a member after supplying the coating solution to the substrate.

* * * * *